United States Patent
Goodwin, III et al.

(10) Patent No.: US 6,757,683 B2
(45) Date of Patent: Jun. 29, 2004

(54) METHOD OF DOWNLOADING WEB CONTENT TO A NETWORK KIOSK IN ADVANCE

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 418 days.

(21) Appl. No.: 09/727,336

(22) Filed: Nov. 29, 2000

(65) Prior Publication Data

US 2002/0065801 A1 May 30, 2002

(51) Int. Cl.[7] .............................................. G06F 17/30
(52) U.S. Cl. .................... 707/10; 707/104.1; 707/3; 709/203
(58) Field of Search ................ 707/1, 3, 10, 104.1; 340/572.1; 235/383; 709/203, 227, 219, 224

(56) References Cited

U.S. PATENT DOCUMENTS

| | | | |
|---|---|---|---|
| 6,286,029 B1 * | 9/2001 | Delph | 709/203 |
| 6,400,272 B1 * | 6/2002 | Holtzman et al. | 340/572.1 |
| 6,434,563 B1 * | 8/2002 | Pasquali et al. | 707/10 |
| 6,477,575 B1 * | 11/2002 | Koeppel et al. | 709/224 |
| 6,493,758 B1 * | 12/2002 | McLain | 709/227 |
| 6,507,867 B1 * | 1/2003 | Holland et al. | 709/219 |
| 6,510,990 B2 * | 1/2003 | Goodwin et al. | 235/383 |

* cited by examiner

Primary Examiner—Charles Rones
Assistant Examiner—Hassan Mahmoudi
(74) Attorney, Agent, or Firm—Paul W. Martin

(57) ABSTRACT

A method of downloading web content during display of a web page which downloads and stores subsequent web content from a list of web content addresses. The method includes the steps of displaying a web page by the kiosk, determining links to web content at a subsequent depth in the web page from a list of web content addresses, and downloading and storing the web content at the subsequent depth and additional depths before displaying another web page until a download limit is exceeded.

8 Claims, 3 Drawing Sheets

FIG. 2

| LIMIT _____ | | — 38 |

| ADDRESS | DESCRIPTION |
|---------|-------------|
| ------- | ------------------------- |
| ------- | ------------------------- |
| ------- | ------------------------- |
| ------- | ------------------------- |
| ------- | ------------------------- |

METHOD OF DOWNLOADING WEB CONTENT TO A NETWORK KIOSK IN ADVANCE

BACKGROUND OF THE INVENTION

The present invention relates to self-service kiosks and more specifically to a method of downloading web content to a network kiosk in advance.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages and other web-delivered content from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

One problem with current global network service is bandwidth limitations. Bandwidth generally varies by type of connection, network usage levels, and time of day. Service problems are complicated by the fact that web pages differ in amount of content and web content differs in size. For example, a typical web page contains text, graphic images, and pointers or hypertext links to other web pages or content. However, web content may motion video files, which due to their size take significantly longer to download, even over high-speed or "T" series lines.

Various general methods of downloading web content are available today. Web browser software applications typically have the ability to store previously downloaded web content in temporary or cache files so that the same content need not be downloaded again the next time the web content is accessed. However, such methods are intended for general purpose operation and thus do not completely serve the needs of retailers. In particular, retailers do not want customers to walk away from their kiosks because web content is arriving to slowly.

Therefore, it would be desirable to provide a downloading method which relies on configuration information suited to the needs of retailers. It would also be desirable to provide a downloading method which automatically downloads subsequent web content while a web page is being displayed.

SUMMARY OF THE INVENTION

In accordance with the teachings of the present invention, a method of downloading web content to a network kiosk in advance is provided.

The method includes the steps of displaying a web page by the kiosk, determining links to web content at a subsequent depth in the web page from a list of web content addresses, and downloading and storing the web content at the subsequent depth and additional depths before displaying another web page until a download limit is exceeded.

It is accordingly an object of the present invention to provide a method of downloading web content to a network kiosk in advance.

It is another object of the present invention to download and store subsequent web content from a list of web content addresses while web page is being displayed.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a depiction of a download configuration file; and

DETAILED DESCRIPTION OF THE PREFERRED EMBODIMENT

Figure 1:
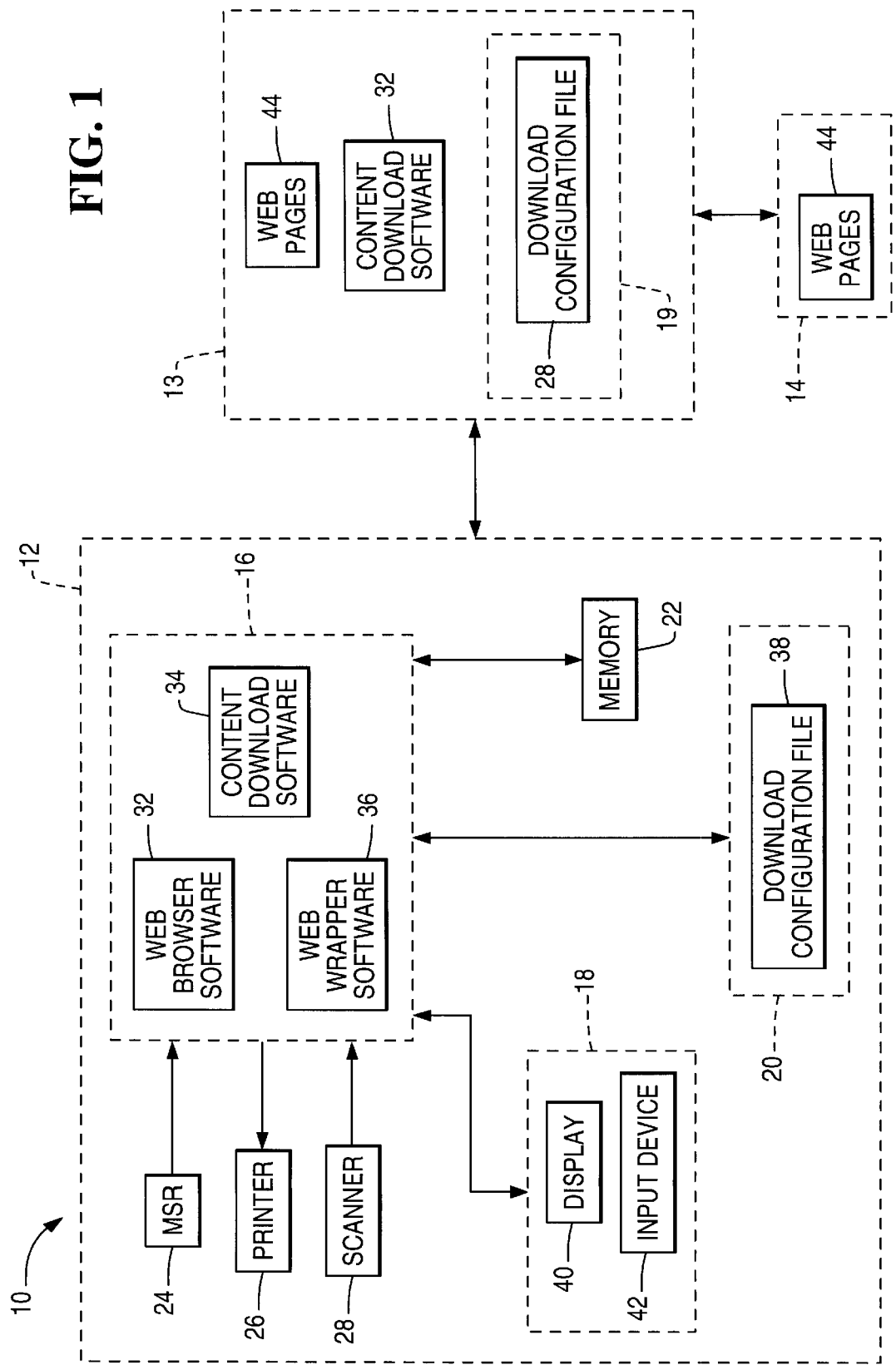
FIG. 1 is a block diagram of a transaction processing system including a network kiosk.

Turning now to FIG. 1, transaction system 10 includes kiosk 12, server 13, and global network 14. Kiosk 12 is preferably located within a transaction establishment, such as a retail store, or transaction environment, such as a shopping mall. Kiosk 12 may include an NCR 7401computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32, content download software 34, and web wrapper software 36.

Web browser software 32 allows an operator to access information and purchase products from retailers through global network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from server 13 and global network 14. Global network 14 includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Content download software 34 downloads web content for web pages associated with links in a currently displayed web page. Content download software 34 may download web content up to a specified limit. Authorized web pages and download limits may be coded into content download software 34 or listed in download configuration file 38 in storage medium 20 to allow a kiosk owner to control operation. Web browser software 32 obtains downloaded web content from storage medium 20 in a known manner before looking to global network 14.

Server 13 may also execute content download software 34, particularly if server 13 is managing delivery of web content to kiosk 12. Server 13 may store its own download configuration file 38 in storage medium 19.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Touch screen 18 includes display 40 and input device 42. Display 40 and input device 42 may also be separate units. Input device 42 may record personal information from an operator.

Memory 20 is used by processor 16 to store executed program information, including web wrapper software information.

MSR 24 reads loyalty, credit, debit, SMART, and/or other types of cards carried by an operator. MSR 24 may record personal information from an operator.

Printer 26 prints information from web wrapper software 32, including information on web pages 44 from network 14. For example, printer 26 may print information relevant to a transaction completed by an operator using kiosk 12.

Scanner 28 reads bar codes on products to obtain product identification numbers. Kiosk 12 queries a transaction server with the identification numbers to obtain information about the product and displays the information.

Figure 2:
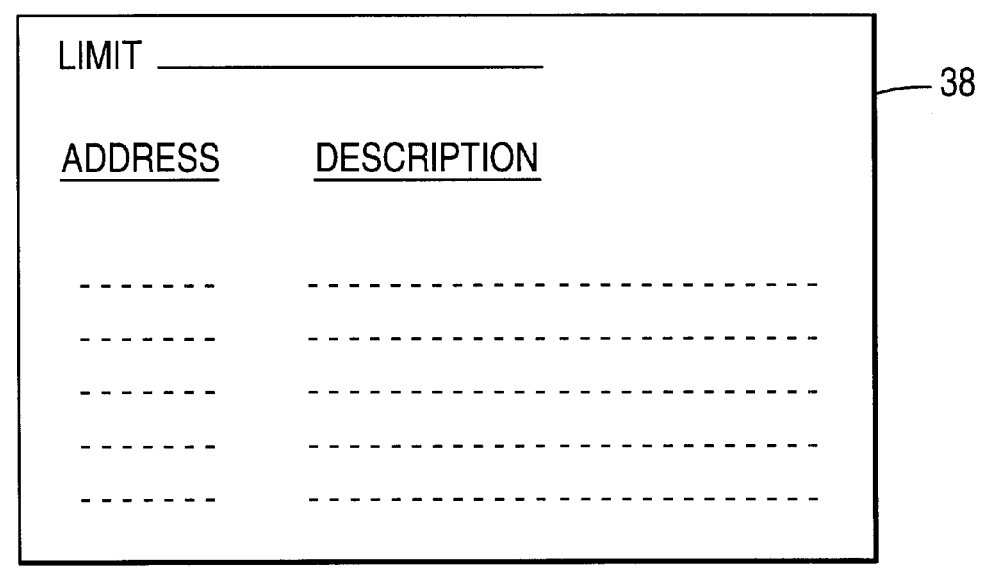

Turning now to FIG. 2, download configuration file 38 includes entries ADDRESS, DESCRIPTION, and LIMIT.

Entry ADDRESS identifies a particular address or Uniform Resource Locator (URL) for kiosk-accessible web pages. Kiosk-accessible web pages preferably include start or "home" pages and a number of web pages accessible from those pages. Address information for kiosk-accessible web sites is inserted by the kiosk owner into download configuration file 38. Thus, the kiosk owner may use download configuration file 38 to restrict access to certain web pages.

Entry DESCRIPTION describes the web page.

Entry LIMIT identifies a depth or size limit on content to be downloaded.

During operation, content download software 34 looks for links to web content in the currently displayed web page. Content download software 34 compares the links to addresses in configuration file 38. If the links are ones which an operator is permitted to follow, content download software 34 follows the links automatically and downloads the web content in advance of selection of any of the links by the operator. Content download software 34 stops drilling down to subsequent links and stops downloading associated web content when entry LIMIT is reached, where enter LIMIT may be a size, depth, or time limitation.

Figure 3:
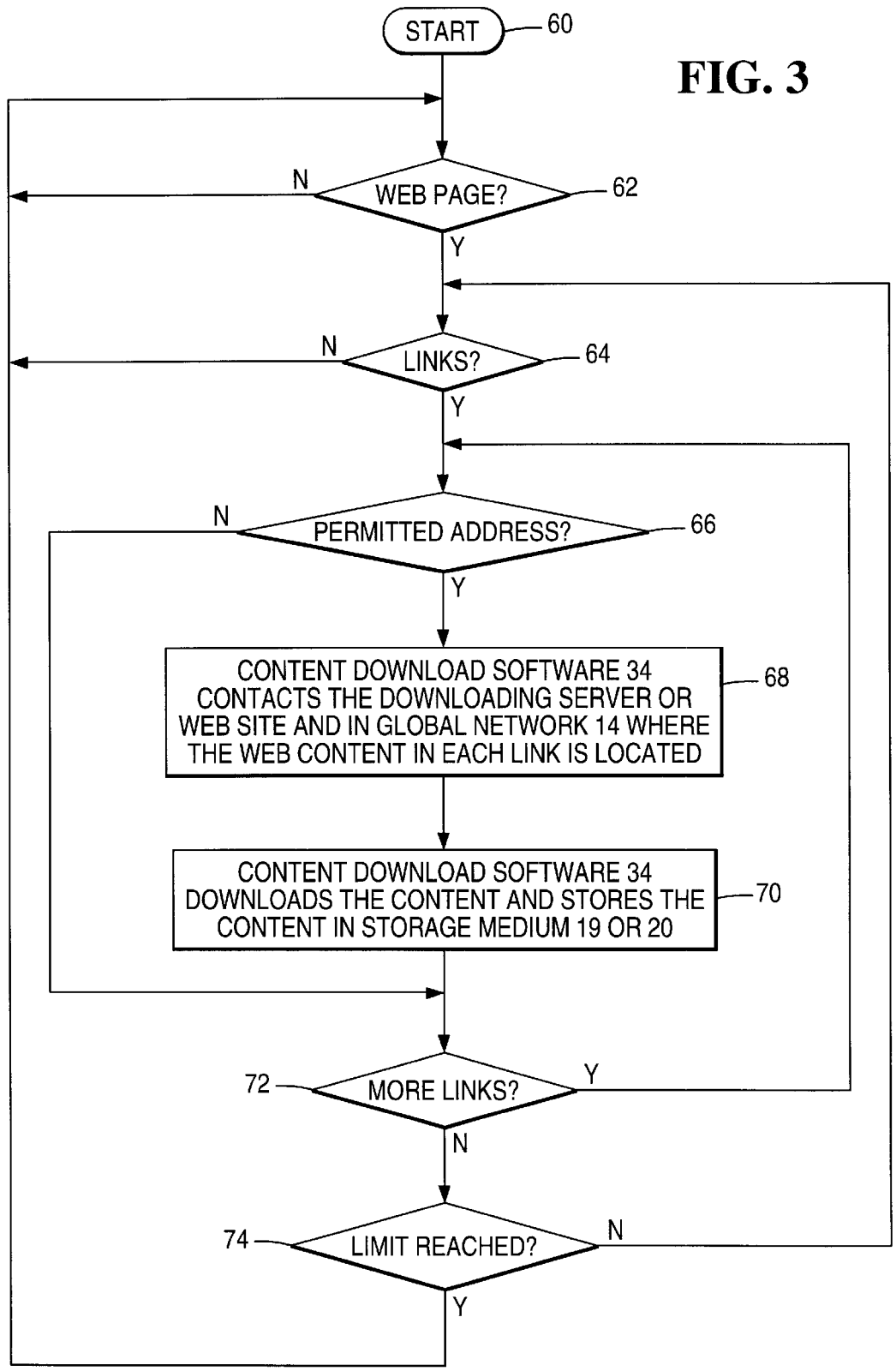
FIG. 3 is a flow diagram illustrating the content downloading method of the present invention.

Turning now to FIG. 3, the method of the present invention is illustrated beginning with START 60.

In step 62, content download software 34 waits for another web page to be displayed.

In step 64, content download software 34 determines whether the web page contains links to other web content at a next layer, including web pages or downloadable files. If so, operation proceeds to step 66. Otherwise, operation returns to step 62 to wait for another web page.

In step 66, content download software 34 determines whether a link address at the next layer can be found in configuration file 38. If the link address cannot be found in configuration file 38, then operation proceeds to step 72. Otherwise, operation proceeds to step 68.

In step 68, content download software 34 contacts the downloading server or web site in global network 14 where the web content in each link is located.

In step 70, content download software 34 downloads the content and stores the content in storage medium 20 (or 19).

In step 72, content download software 34 determines whether additional link addresses at the next layer must be examined. If so, operation returns to step 66. Otherwise, operation proceeds to step 74.

In step 74, content download software 34 determines whether a download limit in entry LIMIT of configuration file 38 has been exceeded. If so, operation returns to step 62 to wait for another web page. If not, operation returns to step 64 to continue drilling down to yet another layer of web content.

For example, if a web page contains links to other web content at a subsequent depth, content download software 34 may be configured to download the other content until a limit is reached, such as a size, depth, or time limit. A possible limit might include obtaining web content from only links in the currently displayed web page and links in the links in the currently displayed web page, or a drill down depth of two. Another possible limit might include drilling down until a content storage size limit has been reached, or drilling down until a time limit is reached.

Advantageously, content download software 34 facilitates having web content available in advance. Web browser software 32 obtains downloaded web content from storage medium 20 in a known manner before looking to global network 14. For example, web browser software 32 records a selection of an address of a web page, reads web content identified in the web page which is located in storage medium 20, and displays the web page with the web content located in storage medium 20.

Although the present invention has been described with particular reference to certain preferred embodiments thereof, variations and modifications of the present invention can be effected within the spirit and scope of the following claims.

We claim:

1. A web content downloading method for a network kiosk comprising the steps of:
   (a) displaying a web page by the kiosk;
   (b) increasing speed of displaying a subsequent web page by
      (b-1) determining links to web content at a subsequent depth in the web page by the kiosk from a list of web content addresses stored in the kiosk;
      (b-2) contacting a number of servers in a global network where the web content at the subsequent depth is stored by the kiosk;
      (b-3) downloading no more than the web content identified by the links in the list from the servers in the global network by the kiosk;
      (b-4) storing the web content at the subsequent depth in a storage medium of the kiosk before displaying another web page by the kiosk; and
      (b-5) repeating steps (b-1) through (b-4) by the kiosk until a download limit identified in the list is exceeded;
   (c) recording selection of the other web page by the kiosk;
   (d) determining whether the web content associated with the other web page was stored in the storage medium by the kiosk;

(e) if the web content associated with the other web page was stored in the storage medium by the kiosk, obtaining the web content associated with the other web page from the storage medium, and displaying the web content associated with the other web page by the kiosk; and (f) if the web content associated with the other web page was not stored in the storage medium by the kiosk, contacting the servers of the global network, downloading the web content associated with the other web page, and displaying the web content associated with the other web page while remaining connected to the global network by the kiosk.

2. The method as recited in claim 1, wherein step (b-5) comprises the substep of:

(b-5) repeating steps (b-1) through (b-4) by the kiosk until a storage limit identified in the list is exceeded.

3. The method as recited in claim 1, wherein step (b-5) comprises the substep of:

(b-5) repeating steps (b-1) through (b-4) by the kiosk until a depth limit identified in the list is exceeded.

4. A web content downloading method for a network kiosk comprising the steps of:

(a) storing a list of web content addresses in a storage medium by the kiosk;

(b) displaying a web page by the kiosk;

(c) increasing speed of displaying subsequent web pages by
  (c-1) determining links to web content at subsequent depths in the web page by the kiosk;
  (c-2) determining whether the links to the web content are in the list of web content addresses by the kiosk;
  (c-3) if the links to the web content are in the list of web content addresses, contacting a number of servers in a global network where the web content at the subsequent depths is stored, downloading the web content from the global network, and storing the web content in the storage medium before displaying another web page by the kiosk; and
  (c-4) repeating steps (c-1) through (c-3) by the kiosk until a download limit in the list is exceeded;

(d) recording selection of the other web page by the kiosk;

(e) determining whether the web content associated with the other web page was stored in the storage medium by the kiosk;

(f) if the web content associated with the other web page was stored in the storage medium by the kiosk, obtaining the web content associated with the other web page from the storage medium, and displaying the web content displaying the web content associated with the other web page by the kiosk; and (g) if the web content associated with the other web page was not stored in the storage medium by the kiosk, contacting the servers of the global network, downloading the web content associated with the other web page, and displaying the web content associated with the other web page while remaining connected to the global network by the kiosk.

5. The method as recited in claim 4, wherein step (c-4) comprises the substep of:

(c-4) repeating steps (c-1) through (c-3) by the kiosk until a storage limit identified in the list is exceeded.

6. The method as recited in claim 4, wherein step (c-4) comprises the substep of:

(c-4) repeating steps (c-1) through (c-3) by the kiosk until a depth limit identified in the list is exceeded.

7. A network kiosk comprising:

a storage medium for storing a list of web content addresses;

a display; and a computer connected to a global network which displays a web page, and which increases speed of displaying a subsequent web page by determining a link to web content at a subsequent depth in the web page and the subsequent web page from the list of web content addresses, by contacting a number of servers in a global network where the web content at the subsequent depth is stored and downloading the web content at the subsequent depth from the global network, and by storing the web content in the storage medium before displaying the subsequent web pages until a download limit identified in the list is exceeded;

wherein the computer also records selection of another web page, determines whether the web content associated with the other web page was stored in the storage medium, obtains the web content associated with the other web page from the storage medium and displays the web content associated with the other web page if the web content associated with the other web page was stored in the storage medium; and wherein the computer also contacts the servers of the global network, downloads the web content associated with the other web page, and displays the associated with the other web page while remaining connected to the global network if the web content associated with the other web page was not stored in the storage medium.

8. A network kiosk comprising:

a storage medium for storing a list of web content addresses;

a display; and a computer connected to a global network which stores a list of web content addresses in the storage medium, displays a web page, and which increases speed of displaying subsequent web pages by determining links to web content at subsequent depths in the web page and the subsequent web pages from the list of web content addresses, determining whether the links to the web content are in the list of web content addresses, contacting a number of servers of the global network, downloading the web content at the subsequent depths from the servers, storing the web content in the storage medium before displaying the subsequent web pages until a download limit identified in the list is exceeded if the links to the web content are in the list of web content addresses;

wherein the computer also records selection of another web page, determines whether the web content associated with the other web page was stored in the storage medium, obtains the web content associated with the other web page from the storage medium if the web content associated with the other web page was stored in the storage medium, and contacts and downloads the web content associated with the other web page from the global network while remaining connected if the web content associated with the other web page was not stored in the storage medium.

* * * * *